(12) United States Patent
Kufluk et al.

(10) Patent No.: US 9,026,787 B2
(45) Date of Patent: May 5, 2015

(54) SECURE ACCESS USING LOCATION-BASED ENCRYPTED AUTHORIZATION

(71) Applicant: International Business Machines Corporation, Armonk, NY (US)

(72) Inventors: Bernard Z. Kufluk, Whitchurch (GB); Adrian R. Warman, Dorset (GB)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/709,014

(22) Filed: Dec. 9, 2012

(65) Prior Publication Data

US 2014/0164761 A1 Jun. 12, 2014

(51) Int. Cl.
*H04L 29/06* (2006.01)
*H04L 9/08* (2006.01)
*H04L 9/32* (2006.01)

(52) U.S. Cl.
CPC .............. *H04L 63/10* (2013.01); *H04L 9/0872* (2013.01); *H04L 9/321* (2013.01)

(58) Field of Classification Search
CPC . H04L 9/3202; H04L 63/10; H04L 2463/041; G06F 2221/2107; G06F 21/606
USPC ........... 713/155; 726/4; 705/67, 80; 380/258; 342/463
See application file for complete search history.

(56) References Cited

U.S. PATENT DOCUMENTS

| | | | |
|---|---|---|---|
| 7,143,289 B2 | 11/2006 | Denning et al. | |
| 7,177,426 B1 | 2/2007 | Dube | |
| 7,435,179 B1 | 10/2008 | Ford | |
| 7,591,020 B2 | 9/2009 | Kammer et al. | |
| 7,840,226 B1 | 11/2010 | Walsh et al. | |
| 8,625,796 B1 * | 1/2014 | Ben Ayed | 380/258 |
| 2006/0078122 A1 * | 4/2006 | Dacosta | 380/258 |
| 2006/0174349 A1 | 8/2006 | Cronce et al. | |
| 2007/0086593 A1 | 4/2007 | Denning et al. | |
| 2007/0116287 A1 * | 5/2007 | Rasizade et al. | 380/258 |
| 2008/0261560 A1 | 10/2008 | Ruckart | |
| 2009/0030848 A1 * | 1/2009 | Wendel | 705/80 |

(Continued)

FOREIGN PATENT DOCUMENTS

WO 2010042248 A1 4/2010

OTHER PUBLICATIONS

Sun, Yan, Thomas F. La Porta, and Parviz Kermani. "A flexible privacy-enhanced location-based services system framework and practice." Mobile Computing, IEEE Transactions on 8.3 (2009): 304-321.*

Gallagher, M. "Location-Based Authorization". Masters Project Plan B Spring 2002.

(Continued)

*Primary Examiner* — Syed Zaidi
(74) *Attorney, Agent, or Firm* — Stephen R. Yoder (57) ABSTRACT

Embodiments of the present invention disclose a method, computer program product, and system for location-based authorization to access a resource. A first computer receives a request to access a resource from a second computer. The request to access the resource includes location information of the second computer. The first computer responds by sending a request to a third computer, requesting location information of the third computer. In response to receiving from the third computer, the location information of the third computer, the first computer determines a distance between the second computer and the third computer. If the distance between the second computer and the third computer fulfills a proximity condition, the first computer authorizes the resource request.

16 Claims, 8 Drawing Sheets

(56) References Cited

U.S. PATENT DOCUMENTS

2009/0034725 A1 2/2009 Davies, Sr. et al.
2010/0138345 A1 6/2010 Lekhtman et al.
2010/0309059 A1* 12/2010 Wu et al. ................ 342/463
2011/0202466 A1* 8/2011 Carter ...................... 705/67

OTHER PUBLICATIONS

Jaros, D. et al. "A New Approach in a Multifactor Authentication and Location-based Authorization". The Sixth International Conference on Internet Monitoring and Protection. ICIMP 2011. Copyright IARIA, 2011. pp. 50-53. Mar. 20, 2011.

Ray, I. and Kumar, M. "Towards a Location-Based Mandatory Access Control Model". Source:Computers & Security, vol. 25, Issue 1, Feb. 2006, pp. 36-44.

Scott, L. and Denning, D. "A Location Based Encryption Technique and Some of Its Applications". Proceedings of the 2003 National Technical Meeting of The Institute of Navigation. <URL:http://faculty.nps.edu/dedennin/publications/LocationBasedEncryption-ION2003.pdf>.

* cited by examiner

SECURE ACCESS USING LOCATION-BASED ENCRYPTED AUTHORIZATION

FIELD OF THE INVENTION

The present invention relates generally to authorization based on location and more particularly to authorization based on the relative proximity of two or more authenticating computing devices.

BACKGROUND OF THE INVENTION

Methods and techniques are known for digital authentication, which includes use of a Public Key Infrastructure for encryption, decryption and authentication. For authorization of sensitive tasks, or requests for access to sensitive materials, granting access requires consideration of authenticating the identity of the requestor and confirmation of the authority of the requestor to have access to the requested resource or to perform a requested task. It may be necessary to have additional authorizing entities concur with authorizing access. A known example of this is the two-key system required to access the contents of a safety deposit box in bank vaults. Other scenarios may include authentication to access a restricted database, access to sensitive or secure documents, or initiating or discontinuing a program or event that is under control of a computing device.

Access to a resource may require authorization from a source in a specified location, or may require the authorizing entity to be at a specified location. This may be to ensure that the requested information would be received at a known and protected environment, or to ensure that the resource is not requested under threat or intimidation.

Existing solutions to scenarios such as those mentioned above present significant security exposure if the specified location information is discovered, or if dedicated hardware is compromised. Depending upon a specified location as a component of authorization can greatly limit the flexibility of secure authorization implementations, as most future needs cannot be foreseen.

SUMMARY

Embodiments of the present invention disclose a method, computer program product, and system for location-based authorization to access a resource. A first computer receives a request to access a resource from a second computer. The request to access the resource includes location information of the second computer. The first computer responds by sending a request to a third computer, requesting location information of the third computer. In response to receiving the location information of the third computer, the first computer determines a distance between the second computer and the third computer. If the distance between the second computer and the third computer fulfills a proximity condition, the first computer authorizes the resource request.

In other embodiments, the first computer encrypts the resource based on the location information of the third computer and the first computer sends to the second computer the encrypted resource. The encrypted resource is decrypted using the location information of the second computer.

In yet other embodiments, a first computer sends a request to access a resource to a second computer, wherein the request includes location information of the first computer. The first computer receives a reply from the second computer, which includes the location information of the first computer and the resource. The resource is encrypted such that a private key of the first computer decrypts the encrypted resource. The reply is encrypted such that a private key of the third computer decrypts the reply. The first computer sends the reply to the third computer, which includes location information of the third computer. The third computer is configured to decrypt the reply, revealing the location information of the first computer and the encrypted resource. The first computer receives the encrypted resource from the third computer in response to the third computer determining a distance between the first computer and the third computer that fulfills a proximity condition.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable non-transitory medium or a computer-readable non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Figure 1:
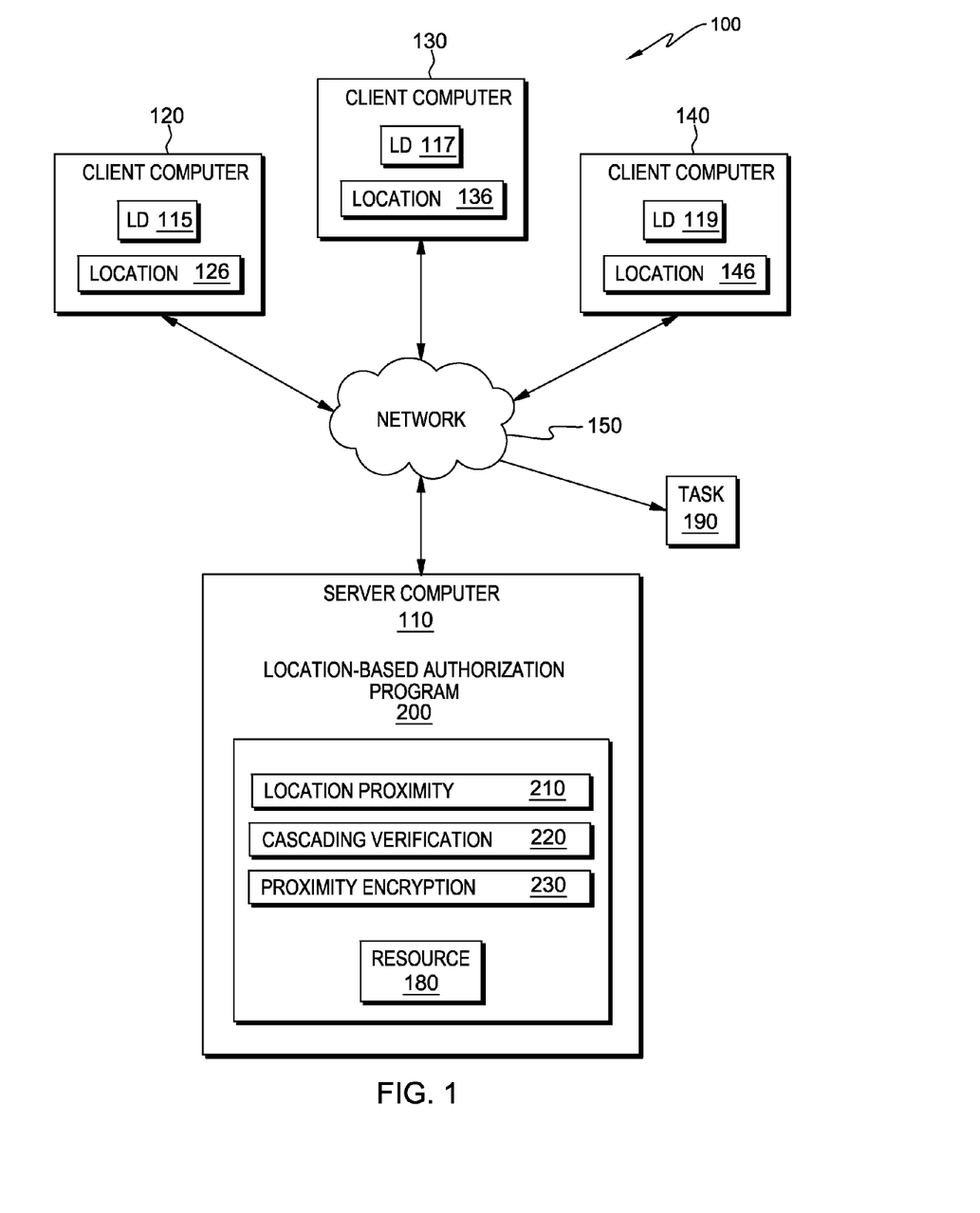
FIG. 1 is a functional block diagram illustrating an authorization environment of distributed computing devices, in accordance with an embodiment of the present invention.

The present invention will now be described in detail with reference to the Figures. FIG. 1 is a functional block diagram illustrating authorization environment 100, in accordance with an embodiment of the present invention. Authorization environment 100 includes server computer 110, task 190, and client computers 120, 130, and 140, all interconnected over network 150. Although the exemplary embodiment of FIG. 1 shows three client computers, other embodiments may include generally two or more client computers.

Network 150 can be, for example, a local area network (LAN), a wide area network (WAN) such as the Internet, or a combination of the two, and can include wired or wireless connections. In general, network 150 can be any combination of connections and protocols that will support communications via suitable channels between client computers 120, 130, and 140, server computer 110 and task 190, in accordance with an embodiment of the present invention.

Authorization environment 100 is a distributed computing environment in which a server, such as server computer 110, functions to receive requests for access authorization and to initiate authorizing activity. Access authorization may include, but is not limited to, access to resources, access to secure areas, and performance of an activity controlled by a computing device, such as server computer 110.

Server computer 110 includes location-based authorization program 200. Server computer 110 receives requests for authorization from client computers within authorization environment 100, and uses location-based authorization program 200 to acquire the location information of the requesting client computer, and one or more additional client computers, to determine authorization. In one embodiment, location-based authorization program 200 uses the client computer location to add additional encryption security. Server computer 110, running location-based authorization program 200, receives requests for authorization, sends messages requesting information or messages including encrypted resources and instructions, determines if authorization requirements are fulfilled and, when fulfilled, approves authorization requests.

Client computers 120, 130, and 140 submit authorization requests to server computer 110, or participate in authorization processes. One or more client computers, for example client computer 130, may receive information requests from server computer 110 associated with an authorization request from another client computer. Client computers responding to information requests from server computer 110 include location information, such as the location information of client computer 130 included in a response from client computer 130, to a request from server computer 110.

In various embodiments, client computers 120, 130, and 140, and server computer 110, can each be a laptop, tablet, or netbook personal computer (PC), a desktop computer, a personal digital assistant (PDA), a smart phone, a mainframe computer, or a networked server computer. Further, server computer 110 can be computing systems utilizing clustered computers and components to act as single pools of seamless resources when accessed through network 150, or can represent one or more cloud computing datacenters. In general, each of server computer 110, client computer 120, client computer 130, and client computer 140 can be any programmable electronic device as described in further detail with respect to FIG. 8.

Client computers 120, 130, and 140 include location devices LD 115, LD 117, and LD 119, respectively. Location devices 115, 117, and 119 may be, for example, satellite-based navigation system chipsets that determine location from the Global Positioning System (GPS), which is a satellite-based navigation system maintained by the U.S. Department of Defense. In other embodiments the location devices 115, 117 or 119 may be a locally connected cell phone with satellite-based navigation system capability, or any device, program or combination of both, that can determine and provide information about the location of client computers 120, 130, and 140. In yet other embodiments, client computers 120, 130, and 140 may include more than one location device such that location information of client computer 120, for example, as determined by one location device, such as LD 115, may be verified by an additional location device (not shown) associated with client computer 120.

Client computers 120, 130, and 140 include locations 126, 136, and 146, respectively. Locations 126, 136, and 146 represent the physical location of the respective client computers, as determined by the respective location devices 115, 117, and 119. Locations 126, 136, and 146 may be represented as coordinates, such as latitude and longitude, or may be represented by a distance and direction from a designated reference point, or may be represented in some other manner of distinct location. Locations 126, 136, and 146 may be determined by a first location device and verified by a second location device. The location information of a client computer, derived, for example, from location 126, 136 or 146, may be scaled to represent an area of a designated size, which can be set as a larger or smaller area to match a predetermined proximity condition or proximity condition for an authorization policy.

In the exemplary embodiment of FIG. 1, task 190 is an activity requiring authorization by server computer 110, prior to the activity being initiated. Task 190 may be, for example, opening an entrance to a secure area, initiation or termination of a program, or initiation or termination of a hardware device. In general, task 190 is identified in an authorization request from a client computer within authorization environment 100 and can be any activity that requires authorization and is controlled by another computing device, such as server computer 110 for example, by direct connection or through connection to network 150.

Location-based authorization program 200 includes program modules: location proximity module 210, cascading verification module 220, and proximity encryption module 230, the operations of which will be explained in more detail with respect to FIGS. 2, 3, 4, 5, 6, and 7. Server computer 110 also includes resource 180, having access controlled by location-based authorization program 200 operating on server computer 110. Resource 180 represents a secure or restricted resource that can only be accessed with approved authorization. Resource 180 may be, but is not limited to, one or more or combinations of: digitized files, folders, pictures, media files, databases, passwords, and programs. Resource 180 can be downloaded or included in an electronic message to a client computer if approved by a computer securely controlling resource 180, or a computer acting on behalf of and under the direction of a computer securely controlling resource 180, such as sever computer 110. Resource 180 may be stored on a computer-readable storage media such as tangible storage device 818, (FIG. 8), which may be an internal component of server computer 110, or an external peripheral device connected to server computer 110, or it may be stored on a storage device accessible to server computer 110 via network 150. Access to resource 180 requires predetermined authorization requirements be fulfilled.

In a preferred embodiment, location-based authorization program 200 approves or rejects received requests for authorization to access resource 180, by analyzing the relative proximity of the location of the requesting client computer and the location of one or more additional client computers. In a preferred embodiment, proximity conditions and the timeframe of a response are predetermined parameters set as part of an established authorization policy that location-based authorization program 200 supports and enforces. In various embodiments, the locations of client computers may be stationary, or may change from one access request transaction to another. Location proximity may refer to geographical location, relative location (within defined areas), or may refer to a computing device connection to a particular physical network node, subnet, wireless network node, router, cell-phone tower, or other connection point that can be identified and referred to as a location. Similarly, distances between locations may be determined as a straight line or Euclidean calculations, or distances between locations may be determined as two points on the surface of a sphere when great circle distances are used for calculations.

Location proximity module 210 receives a request for authorization that includes location information from a first client computer and sends a request for location information to a second client computer. Location proximity module 210 determines the proximity of the two client computer locations, and if the locations fulfill a predetermined proximity authorization policy, the request is approved.

Cascading verification module 220 responds to a first client computer request for authorization to access a secure resource by: encrypting the requested resource so that only the first client computer can decrypt it, adding the location of the first client computer, such as client computer 120, and encrypting the entire message so that it can be decrypted by a key known only to a second client computer, such as client computer 130. The second client computer decrypts the message revealing the location information of the first client computer, which the second client computer compares to its location information. If the proximity of locations fulfills the requirements of a predetermined proximity authorization policy, then the encrypted resource is sent to the requesting client computer, and the requesting client computer decrypts the resource and gains access.

Proximity encryption module 230 performs authorization transaction steps involving third party delivery of the requested resource, similar to of cascading verification module 220, however, proximity encryption module 230 uses an encryption key, based on the location information of the requesting client computer, and a second client computer to further secure transaction messages between the server computer and client computers.

In a preferred embodiment of the present invention, the request and authorization messages exchanged within authorization environment 100 by client computers, such as client computers 120, 130, and 140, and a server computer, such as server computer 110, are encrypted and decrypted using public keys and private keys. The public and private keys of each computing device are uniquely paired and used in the asymmetric encryption and decryption of messages, and the authentication of digital signatures between computer entities.

Figure 2:
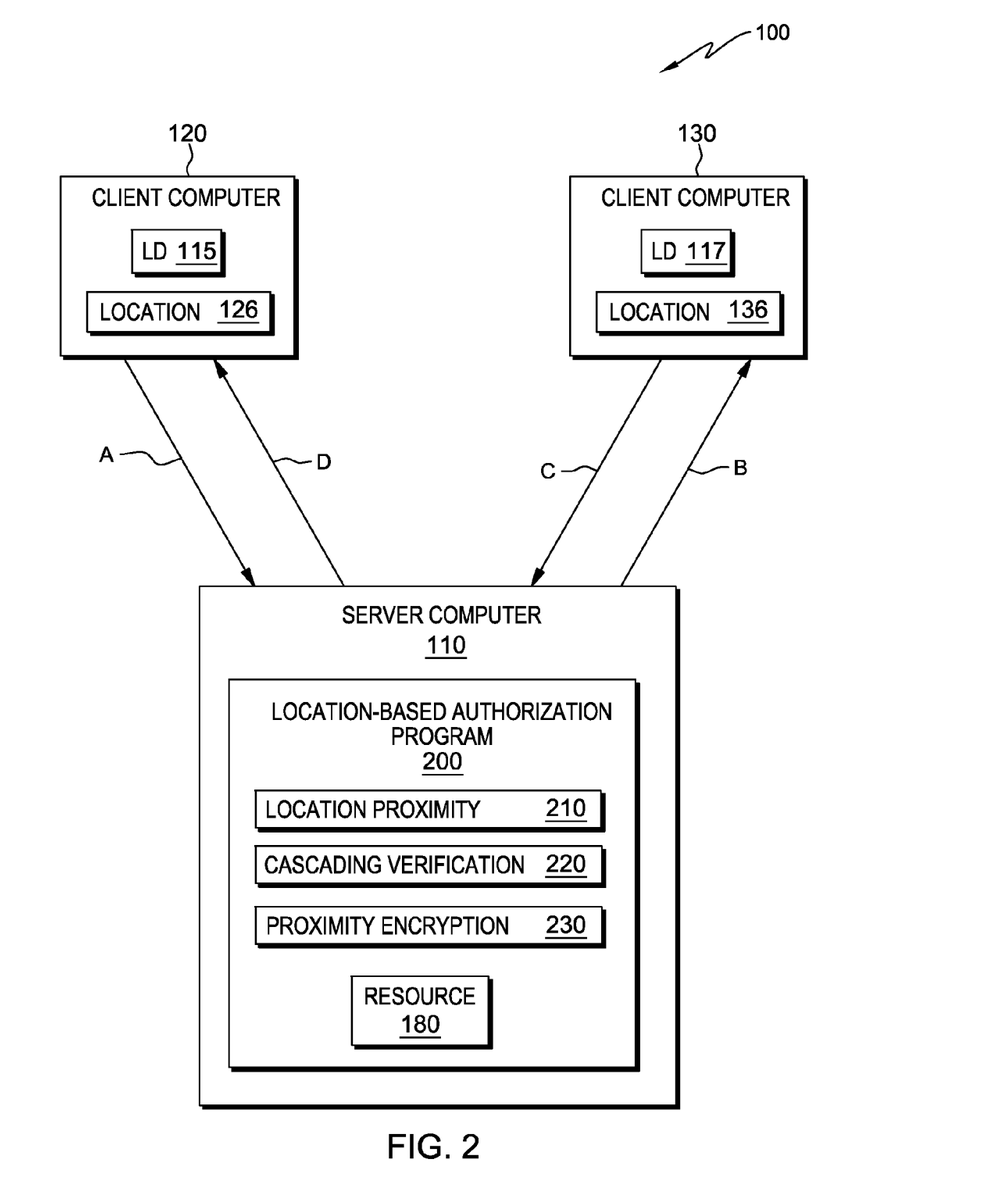
FIG. 2 is a block transaction diagram depicting transaction steps of a location-based authorization program within the authorization environment of FIG. 1, in accordance with an embodiment of the present invention.
Figure 3:
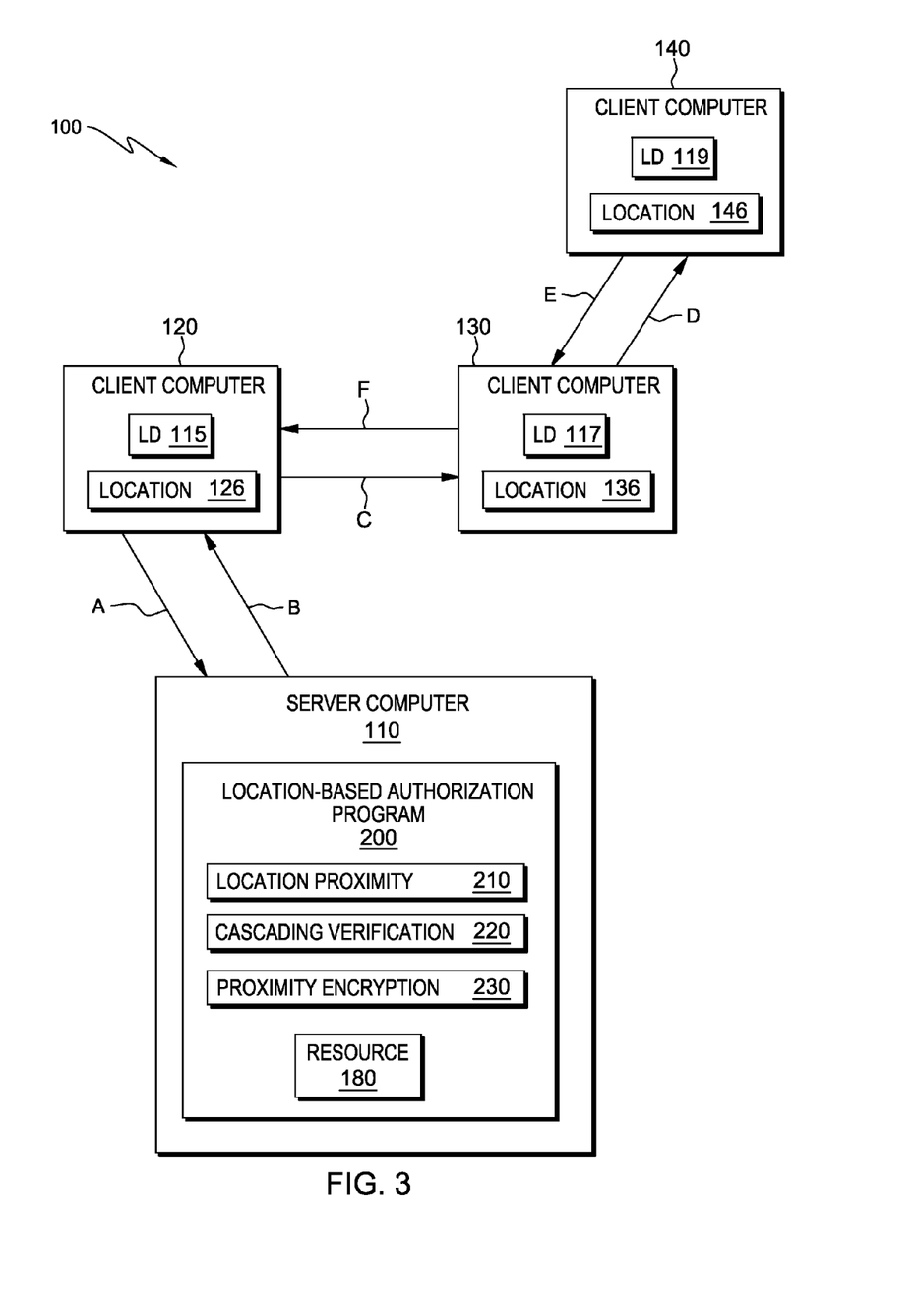
FIG. 3 is a block transaction diagram further depicting transaction steps of a location-based authorization program within the authorization environment of FIG. 1, in accordance with an embodiment of the present invention.
Figure 4:
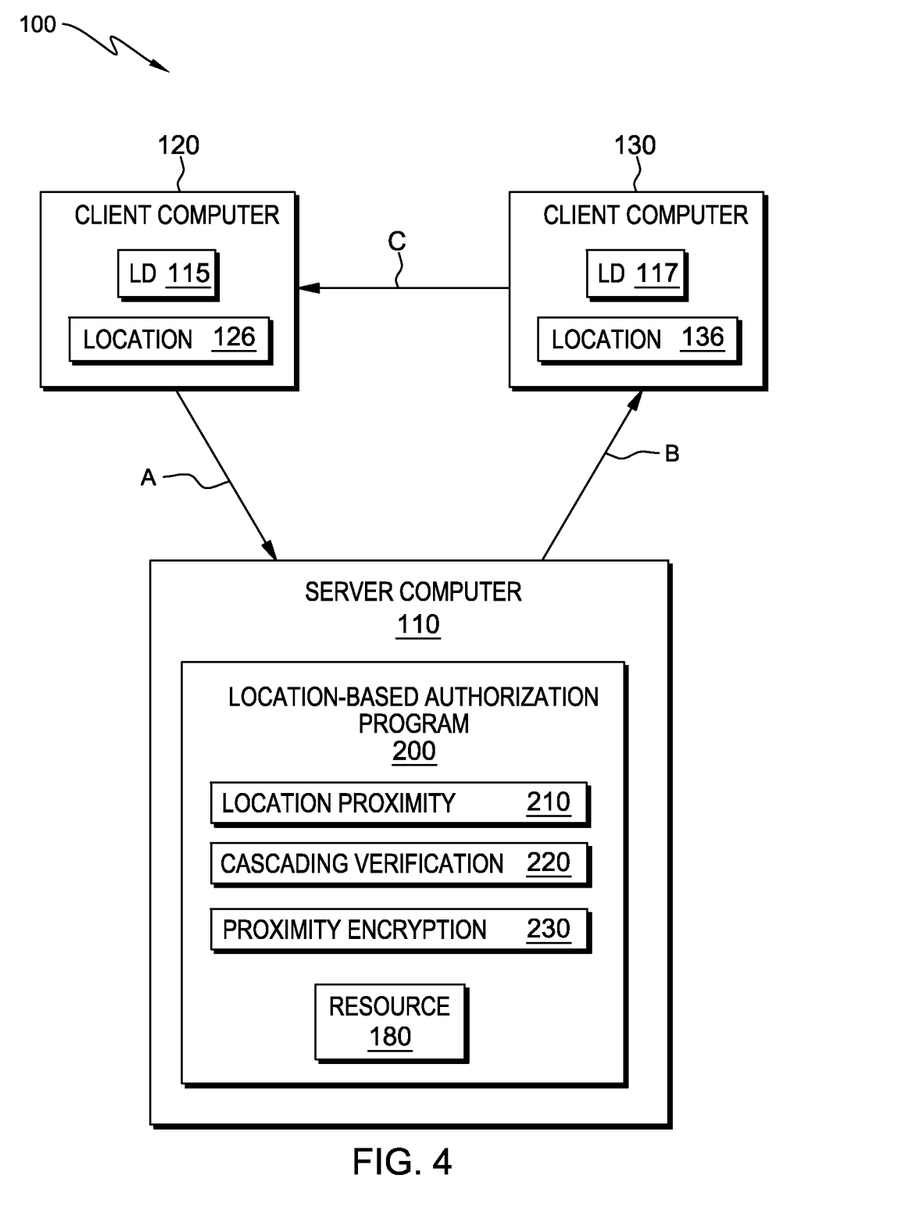
FIG. 4 is a block transaction diagram further depicting transaction steps of a location-based authorization program within the authorization environment of FIG. 1, in accordance with an embodiment of the present invention.

FIGS. 2, 3, and 4 illustrate the transaction steps of the modules of location-based authorization program 200. FIG. 2 is a transaction block diagram illustrating the transactions steps of location proximity module 210 within authorization environment 100 of FIG. 1, in accordance to an embodiment of the present invention. In the embodiment, server computer 110 maintains control over access to resource 180.

In an exemplary embodiment, client computer 120 sends an authorization request A, to location proximity module 210 operating on server computer 110. The request is for access to resource 180, and includes location information 126 of client computer 120, as determined by location device 115. In various embodiments of the present invention, authorization request A may be made using a preformatted form; it may be generated based on a user selection from a listing of resources or other means by which location proximity module 210 can receive and interpret the request; or the request may be input manually by a user of client computer 120 and interpreted manually by a user of server computer 110.

Location proximity module 210 processes authorization request A by creating and transmitting a message B, to client computer 130, which requests the location information of client computer 130. Client computer 130 receives message B and transmits location 136, as determined by location device 117, to location proximity module 210, included in response message C. Location proximity module 210 determines the proximity of the locations of client computers 120 and 130 by calculating the distance between location 126 and location 136. If the proximity condition for authorization is fulfilled, then location proximity module 210 approves authorization request A, retrieves resource 180, and includes the resource in an authorization reply D, which is sent to client computer 120.

FIG. 3 is a transaction block diagram illustrating the transaction steps between client and server computers for program module cascading verification module 220 in accordance to an exemplary embodiment of the present invention.

Client computer 120 sends an authorization request A to cascading verification module 220, for access to resource 180, and the request includes location 126. Cascading verification module 220 processes the request by encrypting resource 180 so that the resource can be decrypted by the private key of client computer 120, and adds location 126 as unencrypted text to encrypted resource 180 in a message. Cascading verification module 220 encrypts the entire message such that decrypting the message requires the private key of client computer 130. In one embodiment, the entire message is encrypted again with the public key of a third client computer, for example client computer 140, and the message requires the private key unique to client computer 140 to decrypt. Cascading verification module 220 sends the encrypted message in a reply B, to client computer 120. Client computer 120 cannot decrypt the message and forwards the message C, to client computer 130. Client computer 130 cannot decrypt the message and forwards the message D, to client computer 140. Client computers 140 is an optional, additional, verification illustrated in FIG. 3, and other embodiments of the present invention, additional client computers may be included in the authorization process, thus offering a cascade of verification for the authorization process.

Client computer 140 decrypts the message using its private key, revealing an encrypted message E that is sent to client computer 130. Client computer 130 decrypts the message using its private key, to reveal location 126 as unencrypted text and encrypted resource 180 that client computer 130 can not decrypt. Client computer 130 uses location 136 to determine if the distance between location 126 and location 136 fulfills a predetermined proximity condition for authorization. If the requirement is fulfilled, then client computer 130 forwards the message F, including encrypted resource 180, to client computer 120. Client computer 120 receives and decrypts the message using its private key, revealing access to resource 180.

FIG. 4 is a transaction block diagram illustrating the transactions steps of proximity encryption module 230, which includes location-based encryption and location-based authorization for requests to access restricted resources.

Proximity encryption module 230 receives an encrypted authorization request A from client computer 120, for access to resource 180 and the request includes location 126. Proximity encryption module 230 authenticates that the request is from client computer 120 and decrypts the request using the private key of server computer 110. Proximity encryption module 230 processes the request for authorization by creating a message B to be sent to client computer 130. Proximity encryption module 230 encrypts resource 180 using the public key of client computer 120 and using location 126 as the basis for creating an encryption key, encrypts resource 180 again. In one embodiment, proximity encryption module 230 adds an unencrypted instruction for client computer 130 to use location 136 as the basis for creating a key to decrypt the message, and encrypts the entire message again using the public key of client computer 130. In another embodiment, client computer 130 uses location 136 as the basis for creating a key to decrypt the message as a matter of established practice or policy. Proximity encryption module 230 sends the encrypted message B to client computer 130.

Client computer 130 receives the encrypted message, authenticates that it is from server computer 110, and decrypts the message using the private key of client computer 130, thus revealing the instruction to use location 136 as the basis for creating a key to decrypt the message further. Client computer 130 uses location 136 as the basis for creating a key and decrypts the message and sends the decrypted message to client 120. If the decryption by client computer 130 was successful, the private key of client computer 120 decrypts resource 180. If the decryption by client computer 130 was unsuccessful, the private key of client computer 120 will be unable to decrypt resource 180 and client computer 120 does not obtain access to resource 180.

Proximity encryption module 230 does not require client computers 120 and 130 to know each other's location, however, it may require the locations to be scaled to an area such that locations residing within the same scaled area are considered by proximity encryption module 230 to be the same location.

Figure 5:
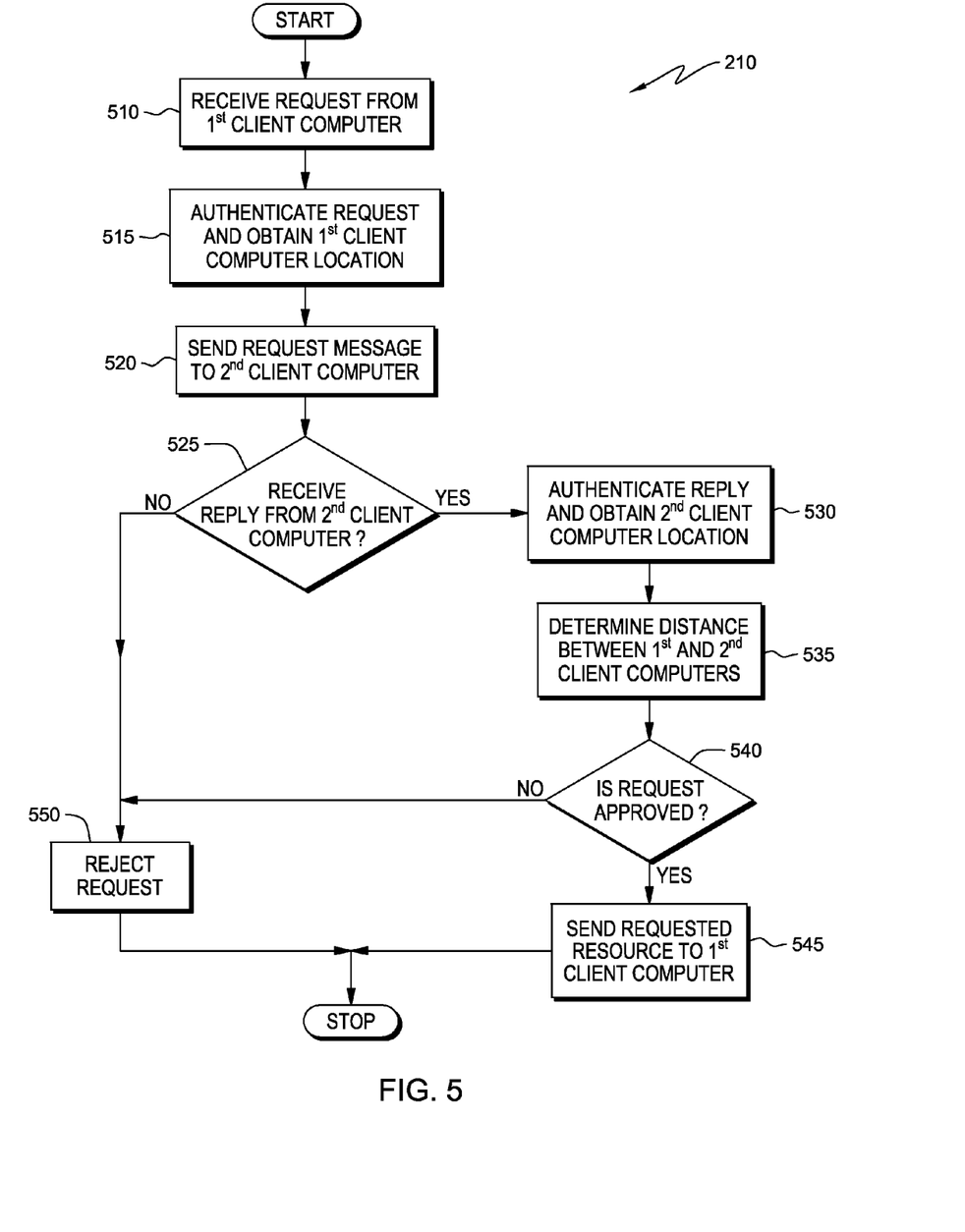
FIG. 5 is a flowchart depicting the steps of a location based authorization and encryption program, in accordance with an embodiment of the present invention.

FIG. 5 is a flowchart depicting the transaction steps of location proximity module 210 in accordance with an embodiment of the present invention. Location proximity module 210 receives a request from a first client computer (step 510), such as client computer 120, as depicted in the transaction diagram of FIG. 2. The request is for authorization to access a resource, such as resource 180, and includes the location of the first client computer, such as client computer 120, for example. Location proximity module 210 verifies the authenticity of the request from the first client computer, for example, by using the public key of client computer 120, and obtains the location information of client computer 120, which is location 126 (step 515).

Location proximity module 210 creates a message requesting the location information of a second client computer and sends the message to the second client computer (step 520), such as client computer 130. If location proximity module 210 receives a reply message from the second client computer (step 525, "yes" branch), location proximity module 210 authenticates the reply, and obtains the location information of the second client computer (step 530). For example, location proximity module 210 authenticates the reply from client computer 130 by using the public key of client computer 130 and receives location 136. If no reply is received from the second client computer, for example client computer 130, within a predetermined amount of time (step 525, "no" branch), location proximity module 210 rejects the request for authorization (step 550) and processing ends.

Having received and authenticated the location information of the first and second client computers, such as locations 126 and 136, location proximity module 210 determines the distance between locations 126 and 136 (step 535). If the distance between locations 126 and 136 fulfills the proximity conditions previously determined for the authorization policy, location proximity module 210 approves the authorization request (step 540, "yes" branch). Location proximity module 210 retrieves and includes the requested resource in a message and sends the message to the first client computer (step 545) and processing ends. For example, location proximity module 210 includes resource 180 in a message and sends the message to client computer 120. The operation of location proximity module 210 ends once the requested resource has been approved, and in this example, delivered.

If location proximity module 210 determines that the distance between the locations of the first and second client computers, such as client computers 120 and 130, does not fulfill the requirements previously determined for the authorization policy (step 540, "no" branch), then location proximity module 210 rejects the request (step 550), and the operation of location proximity module 210 ends.

Figure 6:
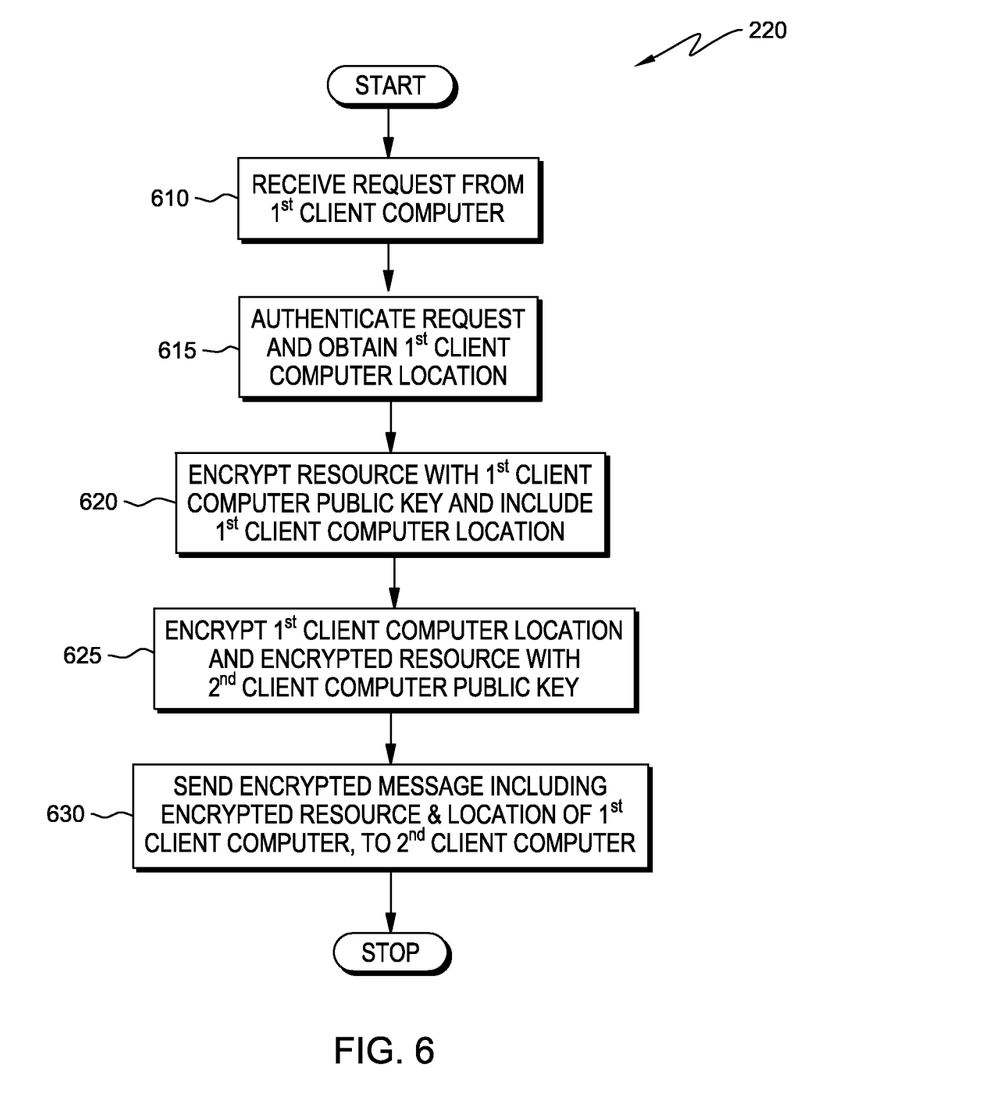
FIG. 6 is a flowchart depicting the steps of an alternate location-based authorization program, in accordance with an embodiment of the present invention.

FIG. 6 is a flowchart depicting the transaction steps of cascading verification module 220, in accordance to an exemplary embodiment of the present invention. Cascading verification module 220 receives a request for authorization from a first client computer (step 610), such as client computer 120, as depicted in the transaction diagram of FIG. 3, to access a secure resource, such as resource 180. Cascading verification module 220 verifies the authenticity of the request and obtains the location information of the first client computer (step 615). For example, cascading verification module 220 uses the public key of client computer 120 to authenticate the request and obtain location 126.

Cascading verification module 220 responds to the request from client computer 120 by encrypting resource 180 using the public key of client computer 120, such that the private key of client computer 120 is required to decrypt resource 180. Additionally, cascading verification module 220 adds the unencrypted location information of the first client computer, such as location 126, to the reply message (step 620). Cascading verification 220 encrypts the entire reply message using the public key of a second client computer, such as client computer 130, such that the private key of client computer 130 is required to decrypt the message (step 625). Cascading verification module 220 can optionally include additional client computers as part of a sequence of reviewers for authorization and thus create a cascade of verifications for the authorization process, as shown in FIG. 3. For exemplary purposes, the flowchart in FIG. 6 illustrates process steps of cascading verification 220 that includes only a second client computer.

Cascading verification module 220 sends the encrypted message that includes encrypted resource 180 and the location of client computer 120, to client computer 130 (step 630). Alternatively, the encrypted message may be sent as a reply from cascading verification module 220 to the requesting client computer, for example client computer 120. Client computer 120 is unable to decrypt the message, and forwards the message to client computer 130, following a previously implemented protocol. After the encrypted message including encrypted resource 180 and location 126 is sent in step 630, processing of cascading verification module 220 ends.

The second client computer receives the encrypted message sent from cascading verification 220, decrypts the message using its private key, revealing the location information of the first client computer. The second client computer determines the distance between the first and second client computers and if the distance fulfills the previously determined authorization requirements then the second client computer sends the encrypted resource in a message, to the first client computer. The first client computer decrypts the resource and has access to the requested resource.

For example, client computer 130 decrypts the message using its private key, revealing encrypted resource 180 and location 126 of client computer 120. Client computer 130 uses its own location information, location 136, and determines the distance between locations 126 and 136. Client computer 130 determines if the distance between locations 126 and 136 fulfills predetermined authorization requirements, and if so, sends encrypted resource 180 to client computer 120. Client computer 120 decrypts the encrypted resource using its private key, and has access to the resource 180.

If, alternatively, the proximity of the first and second client computers, such as client computers 120 and 130, for example, are determined to not fulfill the predefined requirements for authorization, then client computer 130 does not forward encrypted resource 180 to client computer 120.

Figure 7:
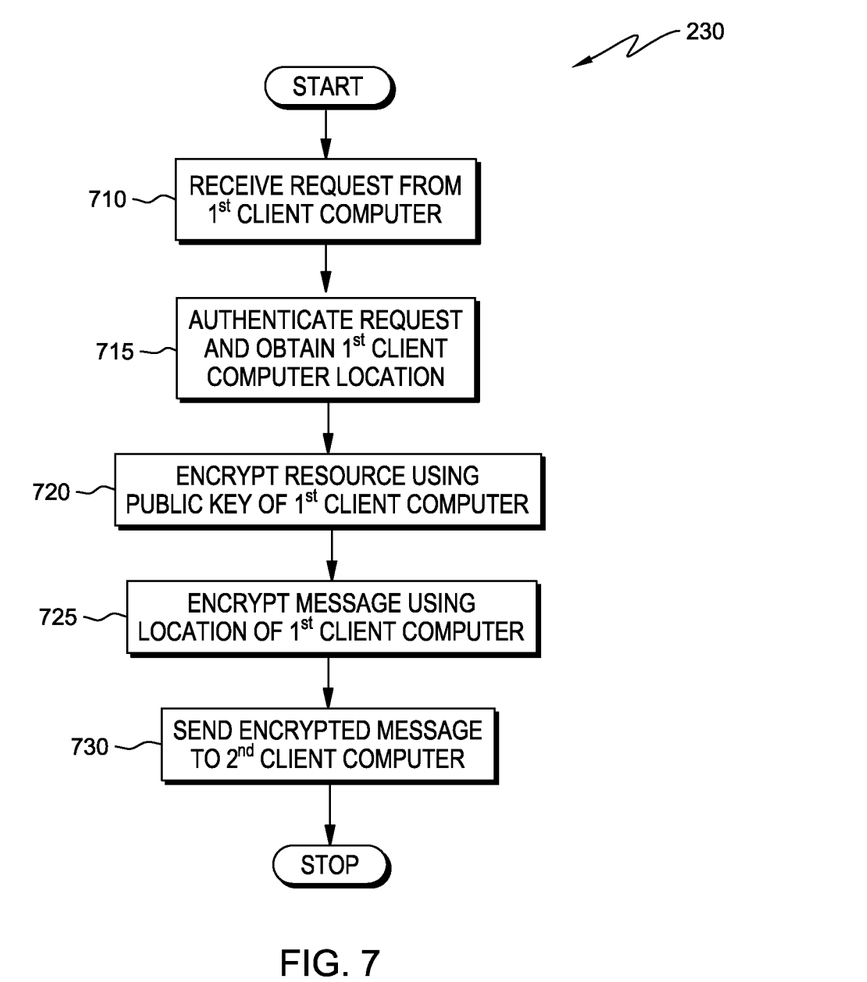
FIG. 7 is a flowchart depicting the steps of an alternate location-based authorization program, in accordance with an embodiment of the present invention.

FIG. 7 is a flowchart depicting the transaction steps of proximity encryption module 230, in accordance to an exemplary embodiment of the present invention. Proximity encryption module 230 uses the location information of a first and second client computer as the basis of creating an encryption key and a decryption key, respectively. The compatibility of the encryption and decryption keys depends on the first and second client computers having the same location. Embodiments of the present invention may use a predetermined scaling factor that defines an area as a location, such that two or more computers positioned within the area are considered to be at the same location. Different implementations may vary the scaling to match the proximity conditions of a predetermined authorization policy.

Proximity encryption module 230 receives a request from a first client computer, for example client computer 120 (step 710), requesting authorization to access a secured resource, such as resource 180, as depicted in the transaction diagram of FIG. 4. Proximity encryption module 230 authenticates the request and obtains the location information of the first client computer, such as location 126, for example, which is included in the request (step 715).

Proximity encryption module 230 responds by preparing a message for a second client computer, such as client computer 130, which includes requested resource 180 encrypted with the public key of client computer 120 (step 720). Proximity encryption module 230 uses location 126 of the first client computer, as a basis of an encryption key and encrypts the entire message using this key (step 725). Proximity encryption module 230 may add an instruction in plain text for client computer 130 to use its own location information, location 136, as the basis of a key to further decrypt the message. Proximity encryption module 230 encrypts the entire message, including the twice-encrypted resource 180 and the plain text instruction, so that only the private key of client computer 130 can decrypt the message. Proximity encryption module 230 sends the encrypted message to client computer 130 (step 730), and ends.

The encrypted message sent from proximity encryption module 230 is received by the second client computer, client computer 130, and is authenticated and decrypted using the private key of client computer 130. The first decryption reveals another encryption and may include an instruction for client computer 130 to use its own location information as the basis of a key to decrypt the message further. Client computer 130 decrypts the message further using its own location as the basis of a decryption key. The decryption reveals the encrypted resource and client computer 130 forwards the encrypted resource to the first client computer.

For example, client computer 130 receives the encrypted message, authenticates it, and decrypts the message using its private key, revealing the instruction to use location 136 as the basis of a key to further decrypt the message. Client computer 130 decrypts the message using a key based on location 136, revealing encrypted resource 180 that requires the private key of client computer 120 to decrypt. If the message is successfully decrypted by client computer 130 using a key based on location 136, encrypted resource 180 can be successfully decrypted by the private key of client computer 120. If location 136 of client computer 130 does not successfully decrypt the message, client computer 120, will not be able to complete the final decryption and will not have access to the requested resource. Client computer 130 forwards encrypted resource 180 to client computer 120. If the locations 126 and 136 are considered the same, the message is successfully decrypted by client computer 130 and sent to client computer 120 as an approved request, such that client computer 120 can decrypt and access resource 180.

In another embodiment, as an alternative to the two client computers having the "same" location, proximity encryption module 230 can be configured to use the calculated distance between the locations as a basis of creating a key to encrypt or decrypt content within a message, such that the calculated distance must fulfill a distance or area of separation matching a predetermined requirement for authorization.

In yet another embodiment, after receiving a request for access to a restricted resource from the first client computer, for example client computer 120, proximity encryption module 230 requests the location of the second client computer, for example, location 136 of client computer 130. Receiving location 136, from client computer 130, proximity encryption module 230 uses location 136 as the basis of an encryption key and encrypts the requested resource, for example resource 180. Proximity encryption module 230 adds instruction for client computer 120 to use its own location, location 126, for example, as the basis of a key to decrypt resource 180, and sends the encrypted message in a reply to client computer 120. If locations 136 and 126 are effectively the same location for creating encryption and decryption keys, respectively, client computer 120 successfully decrypts resource 180 and obtains access. If locations 126 and 136 are not effectively the same location used as a basis of creating encryption and decryption keys, respectively, then client computer 120 cannot successfully decrypt resource 180.

There are many possible alternatives and variations to the ideas presented in the described embodiments. Files or other digital material may be stored external to server computer 110 and may require server computer 110 to provide the granting of authorization through a different computer to execute, for example. Determination of the proximity conditions being fulfilled may be done by server computer 110, a second client computer or a different computer, however fulfilling the location proximity is required to approve the authorization.

Figure 8:
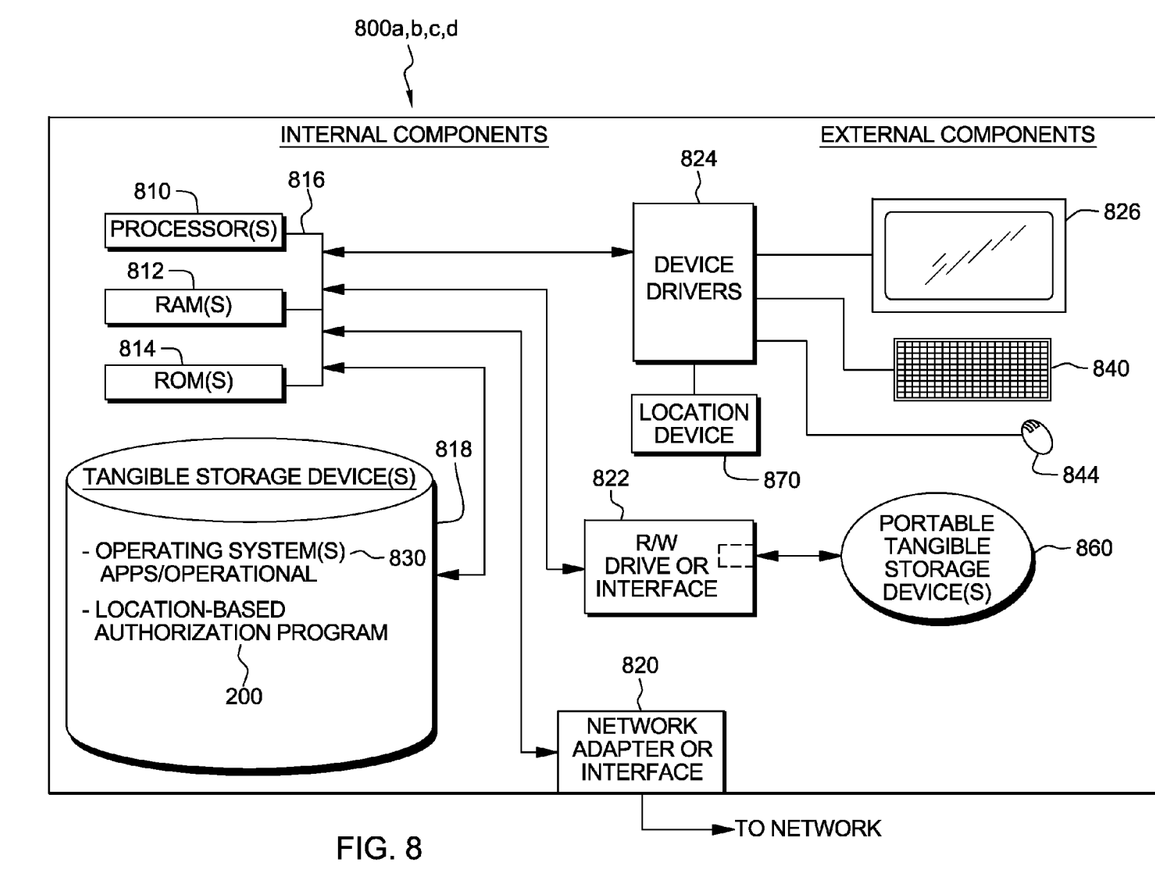
FIG. 8 is a block diagram of the computing devices executing the transaction and program steps, in accordance with an embodiment of the present invention.

FIG. 8 depicts a block diagram of various components of server computer 110, client computer 120, client computer 130 and client computer 140, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Data processing system 800 is representative of any electronic device capable of executing machine-readable program instructions. Data processing system 800 may be representative of a smart phone, a computer system, PDA, or other electronic devices. Examples of computing systems, environments, and/or configurations that may represented by data processing system 800 include, but are not limited to, personal computer systems, server computer systems, thin clients, thick clients, hand-held or laptop devices, multiprocessor systems, micro-processor-based systems, network PCs, minicomputer systems, and distributed cloud computing environments that include any of the above systems or devices.

Server computer 110, and client computers 120, 130, and 140 include respective sets of internal and external components 800a, b, c, and d, illustrated in FIG. 8. Each of the sets of components 800a, b, c, and d includes one or more processors 810, one or more computer-readable RAMs 812 and one or more computer-readable ROMs 814 on one or more buses 816, and one or more operating systems 830, and one or more computer-readable tangible storage devices 818. The one or more operating systems 830 and location-based authorization program 200 includes the program modules location proximity module 210, cascading verification module 220 and proximity encryption module 230, which can be stored in tangible storage device(s) 818 for execution by one or more of the respective computer processors 810 via one or more respective RAMs 812 (which typically include cache memory). In the embodiment illustrated in FIG. 8, each of the computer-readable tangible storage devices 818 is a magnetic disk storage device of an internal hard drive. Alternatively, each of the computer-readable tangible storage devices 818 is a semiconductor storage device such as ROM 814, EPROM, flash memory or any other computer-readable tangible storage device that can store a computer program and digital information.

Each set of internal components 800a, b, c, and d also includes a R/W drive or interface 822 to read from and write to one or more portable computer-readable tangible storage devices 860 such as a CD-ROM, DVD, memory stick, magnetic tape, magnetic disk, optical disk or semiconductor storage device. Location-based authorization program 200 includes the program modules location proximity module 210, cascading verification module 220 and proximity encryption module 230, can be stored on one or more of portable computer-readable tangible storage devices 860, read via R/W drive or interface 822 and loaded into tangible storage device(s) 818.

Each set of internal components 800a, b, c, and d also includes network adapters or interfaces 820 such as a TCP/IP adapter cards, wireless wi-fi interface cards, or 3G or 4G wireless interface cards or other wired or wireless communication links. Location-based authorization program 200, which includes the program modules location proximity module 210, cascading verification module 220, and proximity encryption module 230, can be downloaded from an external computer via a network (for example, the Internet, a local area network or other, wide area network) and network adapter or interface 820. From the network adapter or interface 820, location-based authorization program 200, which includes the program modules location proximity module 210, cascading verification module 220, and proximity encryption module 230, are loaded into tangible storage device(s) 818. The network may comprise copper wires, optical fibers, wireless transmission, routers, firewalls, switches, gateway computers and/or edge servers.

Each of the sets of internal components 800a, b, c, and d also includes device drivers 824 to interface with input and output devices. The input and output devices can include a computer display monitor 826, a keyboard 840, a keypad, a touch screen, a computer mouse 844, and/or some other suitable input device. Device drivers 824 also interface with location device 870, which provides location information to location-based authorization program 200, residing in tangible storage device 818 or optionally in portable tangible storage device 860. The device drivers 824, R/W drive or interface 822 and network adapter or interface 820 comprise hardware and software (stored in tangible storage device 818 and/or ROM 814).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for authorizing access to a resource, the method comprising:
   a first computer receiving from a second computer a request to access a resource, the resource access request including location information of the second computer;
   the first computer sending a request to a third computer requesting location information of the third computer;
   in response to receiving from the third computer the location information of the third computer, the first computer determining a distance between the second computer and the third computer;
   responsive to the distance between the second computer and the third computer fulfilling a proximity condition, the first computer encrypting the resource based on the location information of the third computer; and
   the first computer sending to the second computer the encrypted resource, wherein the encrypted resource is decrypted using the location information of the second computer.

2. The method of claim 1, wherein the location information of the second computer and the location information of the third computer includes location information from a first location device verified by a second location device.

3. The method of claim 1, wherein the determined distance between the second computer and the third computer is a Euclidean distance.

4. The method of claim 1, wherein the determined distance between the second computer and the third computer is a great circle distance.

5. The method of claim 1, wherein fulfilling the proximity condition includes compliance to a predetermined parameter of distance between the second computer and the third computer.

6. A computer program product for authorizing access to a resource, the computer program product comprising:
   one or more non-transitory computer-readable storage media and program instructions stored on the one or more non-transitory computer-readable storage media, the program instructions comprising:
   program instructions for a first computer to receive from a second computer a request to access a resource, the resource access request including location information of the second computer;
   program instructions for the first computer to send a request to a third computer requesting location information of the third computer;
   in response to receiving from the third computer the location information of the third computer, program instructions for the first computer to determine a distance between the second computer and the third computer;
   responsive to the distance between the second computer and the third computer fulfilling a proximity condition, program instructions for the first computer to encrypt the resource based on the location information of the third computer; and
   program instructions for the first computer to send to the second computer the encrypted resource, wherein the encrypted resource is decrypted using the location information of the second computer.

7. The computer program product of claim 6, wherein the resource further comprises one or combination of: digitized media, operation of a computer-readable program, operation of a device, operation of a switch, operation of a lock.

8. The computer program product of claim 6, wherein the location information of the second computer and the location information of the third computer includes location information from a first location device to be verified by a second location device.

9. The computer program product of claim 6, wherein the determined distance between the second computer and the third computer is a Euclidean distance.

10. The computer program product of claim 6, wherein the determined distance between the second computer and the third computer is a great circle distance.

11. The computer program product of claim 6, wherein fulfilling the proximity condition includes compliance to a predetermined parameter of distance between the second computer and the third computer.

12. A computer system for authorizing access to a resource, the computer system comprising:
   one or more computer processors;
   one or more non-transitory computer-readable storage media;
   program instructions stored on the non-transitory computer-readable storage media for execution by at least one of the one or more processors, the program instructions comprising:
   program instructions for a first computer to receive from a second computer a request to access a resource, the resource access request including location information of the second computer;
   program instructions for the first computer to send a request to a third computer requesting location information of the third computer;
   in response to receiving from the third computer the location information of the third computer, program instructions for the first computer to determine a distance between the second computer and the third computer;

responsive to the distance between the second computer and the third computer fulfilling a proximity condition, program instructions for the first computer to encrypt the resource based on the location information of the third computer; and program instructions for the first computer to send the resource to the second computer, wherein the resource is decrypted using the location information of the second computer.

13. The computer system in accordance with claim 12, wherein the resource further comprises one or combination of: digitized media, operation of a computer-readable program, operation of a device, operation of a switch, operation of a lock.

14. The computer system in accordance with claim 12, wherein the distance between the second computer and the third computer is a Euclidean distance.

15. The computer system in accordance with claim 12, wherein the distance between the second computer and the third computer is a great circle distance.

16. The computer system in accordance with claim 12, wherein fulfilling the proximity condition includes program instructions for compliance to a predetermined parameter of distance between the second computer and the third computer.

* * * * *